US012743804B2

(12) United States Patent
Hamano et al.

(10) Patent No.: US 12,743,804 B2
(45) Date of Patent: Sep. 22, 2026

(54) DETERIORATION DETERMINATION DEVICE, DETERIORATION DETERMINATION METHOD, AND PROGRAM

(71) Applicant: NTT, Inc., Tokyo (JP)

(72) Inventors: Yujin Hamano, Tokyo (JP); Kazuaki Watanabe, Tokyo (JP); Daisuke Uchibori, Tokyo (JP); Yosuke Sakurada, Tokyo (JP); Atsushi Aratake, Tokyo (JP)

(73) Assignee: NTT, Inc., Tokyo (JP)

( * ) Notice: Subject to any disclaimer, the term of this patent is extended or adjusted under 35 U.S.C. 154(b) by 309 days.

(21) Appl. No.: 18/566,638

(22) PCT Filed: Jun. 4, 2021

(86) PCT No.: PCT/JP2021/021432
§ 371 (c)(1),
(2) Date: Dec. 2, 2023

(87) PCT Pub. No.: WO2022/254715
PCT Pub. Date: Dec. 8, 2022

(65) Prior Publication Data
US 2024/0265564 A1 Aug. 8, 2024

(51) Int. Cl.
*G06T 7/60* (2017.01)

(52) U.S. Cl.
CPC ...... *G06T 7/60* (2013.01); *G06T 2207/30168* (2013.01)

(58) Field of Classification Search
CPC ... G06T 7/60; G06T 2207/30168; G06T 7/00; G06T 7/0004; G06T 7/001
See application file for complete search history.

(56) References Cited

U.S. PATENT DOCUMENTS 12,179,268 B2 * 12/2024 Wei ..................... G06F 30/10
12,190,019 B2 * 1/2025 Nyholt .................. G06F 30/10
(Continued)

FOREIGN PATENT DOCUMENTS

JP 2021032650 A 3/2021
WO 2021024499 A1 2/2021

OTHER PUBLICATIONS

JDRONE Co., Ltd. (2020) "What is an "orthoimage" created by drone surveying?" literature [online] Jul. 20, 2020, website: https://jdrone.tokyo/ortho-commentary/.

*Primary Examiner* — Santiago Garcia

(57) ABSTRACT

A deterioration determination device (2) according to the present disclosure includes an input unit (21) that receives an input of image data indicating an image including a figure of an inspection object, a correction unit (232) that generates a corrected image in which the image is corrected to increase an aspect ratio of a region surrounding the figure of at least some inspection object included in the image, a target region extraction unit (252) that extracts, from the corrected image, a target region indicating the figure of the inspection object included in the corrected image, a deterioration region detection unit (253) that detects a deterioration region indicating a figure of a deterioration portion of the inspection object from the corrected image, and a determination unit (254) that determines a deterioration degree of the inspection object based on the target region and the deterioration region.

20 Claims, 11 Drawing Sheets

(56) References Cited

U.S. PATENT DOCUMENTS

| | | | | |
|---|---|---|---|---|
| 2009/0073087 | A1* | 3/2009 | Janson | G02B 30/27 345/55 |
| 2011/0312841 | A1* | 12/2011 | Silverbrook | C12Q 1/68 506/40 |
| 2014/0076180 | A1* | 3/2014 | Anderson, III | B41F 27/005 101/483 |
| 2017/0372474 | A1* | 12/2017 | Behar | A61B 5/0035 |
| 2018/0348144 | A1* | 12/2018 | Ando | G01N 21/8806 |
| 2022/0092758 | A1* | 3/2022 | Tashiro | H04N 1/00084 |
| 2022/0113261 | A1* | 4/2022 | Takayama | G01N 21/8803 |
| 2022/0198721 | A1* | 6/2022 | Melnik | G06N 3/08 |
| 2022/0317055 | A1* | 10/2022 | Higa | G06T 7/0008 |
| 2023/0094672 | A1* | 3/2023 | Miyashita | G06T 7/55 382/104 |
| 2023/0281967 | A1* | 9/2023 | Watanabe | G06V 10/22 382/159 |
| 2023/0357950 | A1* | 11/2023 | Shimizu | C30B 15/26 |
| 2024/0257337 | A1* | 8/2024 | Windrim | G06T 7/75 |
| 2025/0239067 | A1* | 7/2025 | Hamano | G06V 10/242 |

* cited by examiner

Figure 4:
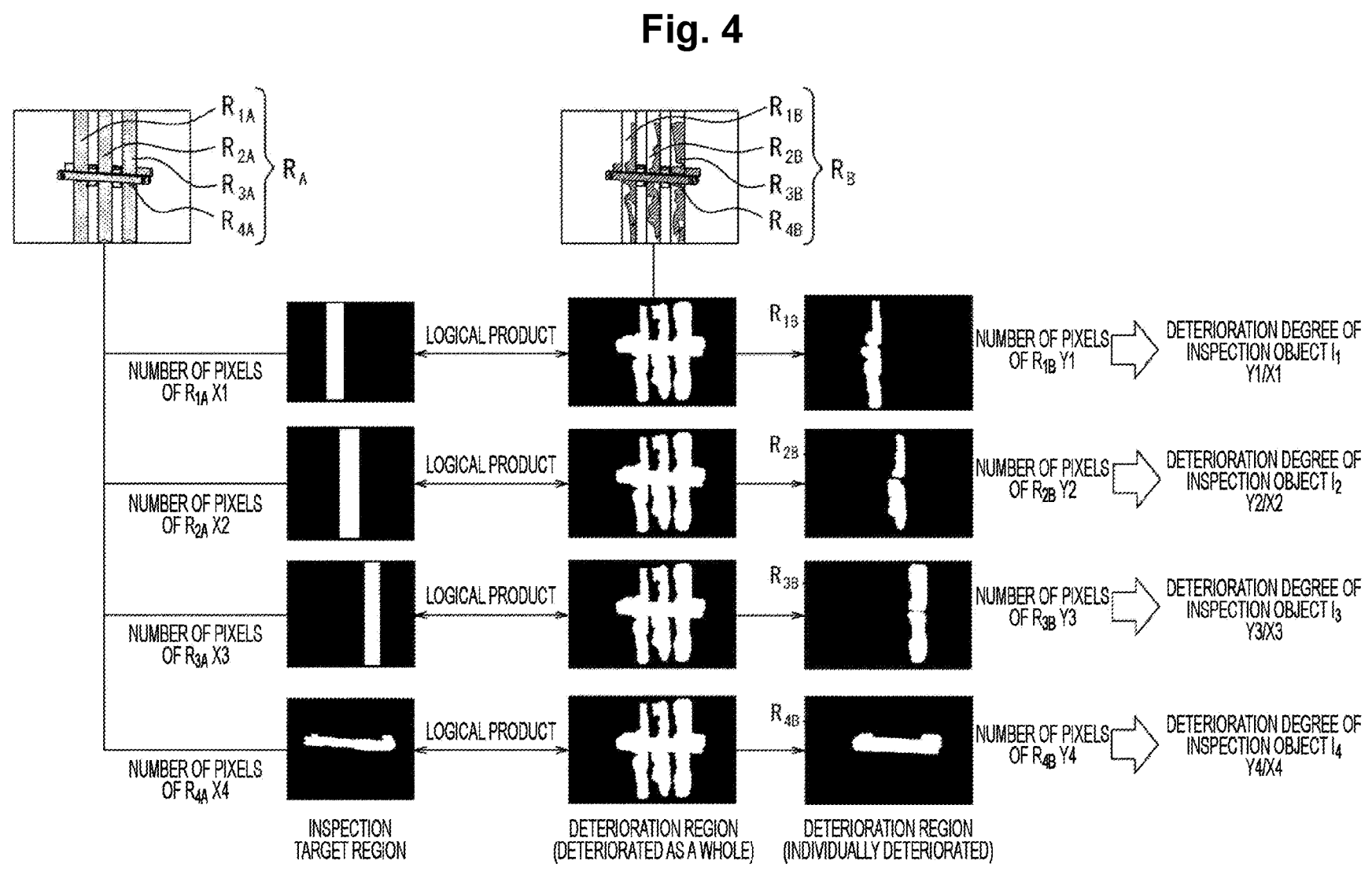

NUMBER OF PIXELS OF $R_{1A}$ X1
NUMBER OF PIXELS OF $R_{2A}$ X2
NUMBER OF PIXELS OF $R_{3A}$ X3
NUMBER OF PIXELS OF $R_{4A}$ X4

INSPECTION TARGET REGION

LOGICAL PRODUCT
LOGICAL PRODUCT
LOGICAL PRODUCT
LOGICAL PRODUCT

DETERIORATION REGION (DETERIORATED AS A WHOLE)

$R_{1B}$
$R_{2B}$
$R_{3B}$
$R_{4B}$

DETERIORATION REGION (INDIVIDUALLY DETERIORATED)

NUMBER OF PIXELS OF $R_{1B}$ Y1
NUMBER OF PIXELS OF $R_{2B}$ Y2
NUMBER OF PIXELS OF $R_{3B}$ Y3
NUMBER OF PIXELS OF $R_{4B}$ Y4

DETERIORATION DEGREE OF INSPECTION OBJECT $I_1$ Y1/X1
DETERIORATION DEGREE OF INSPECTION OBJECT $I_2$ Y2/X2
DETERIORATION DEGREE OF INSPECTION OBJECT $I_3$ Y3/X3
DETERIORATION DEGREE OF INSPECTION OBJECT $I_4$ Y4/X4

Fig. 5

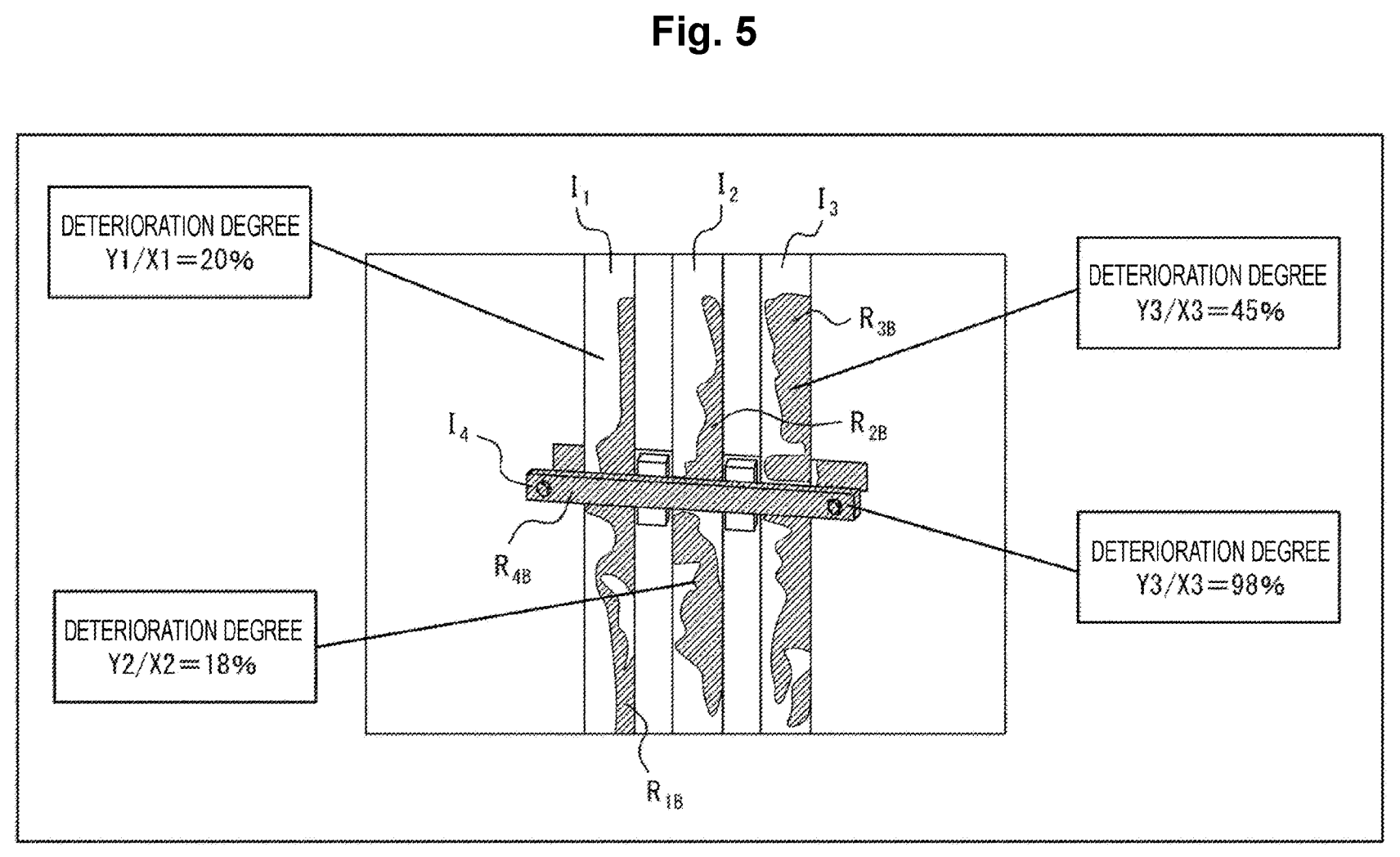

DETERIORATION DEGREE Y3/X3=45%

DETERIORATION DEGREE Y3/X3=98%

DETERIORATION DEGREE Y1/X1=20%

DETERIORATION DEGREE Y2/X2=18%

$I_1$ $I_2$ $I_3$ $I_4$ $R_{1B}$ $R_{2B}$ $R_{3B}$ $R_{4B}$

DETERIORATION DETERMINATION DEVICE, DETERIORATION DETERMINATION METHOD, AND PROGRAM

CROSS-REFERENCE TO RELATED APPLICATIONS

This application is a U.S. 371 Application of International Patent Application No. PCT/JP2021/021432, filed on 4 Jun. 2021, the disclosure of which is hereby incorporated herein by reference in its entirety.

TECHNICAL FIELD

The present disclosure relates to a deterioration determination device, a deterioration determination method, and a program for determining a deterioration degree of an inspection object.

BACKGROUND ART

It is known to extract a region (hereinafter, referred to as "target region") indicating a figure of an inspection object from an image using image processing using deep learning such as Mask-R-Convolutional Neural Network (CNN). In a case where the figure of the inspection object obliquely extends with respect to the peripheral edge defining the entire image, the entire image or a region including a part of the inspection object and the background may be extracted by using the image processing using the deep learning. That is, there is a problem that the target region is not extracted with high accuracy, and thus the deterioration degree of the inspection object cannot be calculated with high accuracy.

Ortho-correction is known as a technique for changing the direction of a figure included in an image (Non Patent Literature 1). In the ortho-correction, the figure of the object shown at any position in the image is corrected such that the front of the object is imaged facing the imaging element. Therefore, in the image subjected to the ortho-correction, the position and size of the object whose figure is included are accurately indicated.

CITATION LIST

Non Patent Literature

Non Patent Literature 1: "What is the "ortho-image" created by drone surveying? | JDRONE", [online], [retrieved on May 21, 2021], the Internet <URL:https://jdrone.tokyo/ortho-commentary/>

SUMMARY OF INVENTION

Technical Problem

However, in the ortho-correction, it is necessary to acquire a plurality of images having overlapping regions within an imaging range including an object. Therefore, in an image having no overlapping region, it may be impossible to perform correction such that a target region is appropriately extracted using ortho-correction. Therefore, there remains a problem that the deterioration degree of the inspection object cannot be determined with high accuracy.

An object of the present disclosure made in view of such circumstances is to provide a deterioration determination device, a deterioration determination method, and a program capable of determining a deterioration degree of an inspection object with high accuracy.

Solution to Problem

In order to solve the above problem, a deterioration determination device according to the present disclosure includes an input unit that receives an input of image data indicating an image including a figure of an inspection object, a correction unit that generates a corrected image in which the image is corrected to increase an aspect ratio of a region surrounding the figure of at least some inspection object included in the image, a target region extraction unit that extracts, from the corrected image, a target region indicating the figure of the inspection object included in the corrected image, a deterioration region detection unit that detects a deterioration region indicating a figure of a deterioration portion of the inspection object from the corrected image, and a determination unit that determines a deterioration degree of the inspection object based on the target region and the deterioration region.

In addition, in order to solve the above problem, a deterioration determination method according to the present disclosure includes a step of receiving an input of image data indicating an image including a figure of an inspection object, a step of generating a corrected image in which the image is corrected to increase an aspect ratio of a region surrounding the figure of at least some inspection object included in the image, a step of extracting, from the corrected image, a target region indicating the figure of the inspection object included in the corrected image, a step of detecting a deterioration region indicating a figure of a deterioration portion of the inspection object from the corrected image, and a step of determining a deterioration degree of the inspection object based on the target region and the deterioration region.

Further, in order to solve the above problems, according to the present disclosure, there is provided a program for causing a computer to function as the deterioration determination device described above.

Advantageous Effects of Invention

According to the deterioration determination device, the deterioration determination method, and the program according to the present disclosure, it is possible to determine the deterioration degree of an inspection object with high accuracy.

BRIEF DESCRIPTION OF DRAWINGS

FIG. 4 is a diagram for illustrating determination of a deterioration degree by a determination unit illustrated in FIG. 1.

FIG. 5 is a diagram illustrating an example of display data.

DESCRIPTION OF EMBODIMENTS

Figure 1:
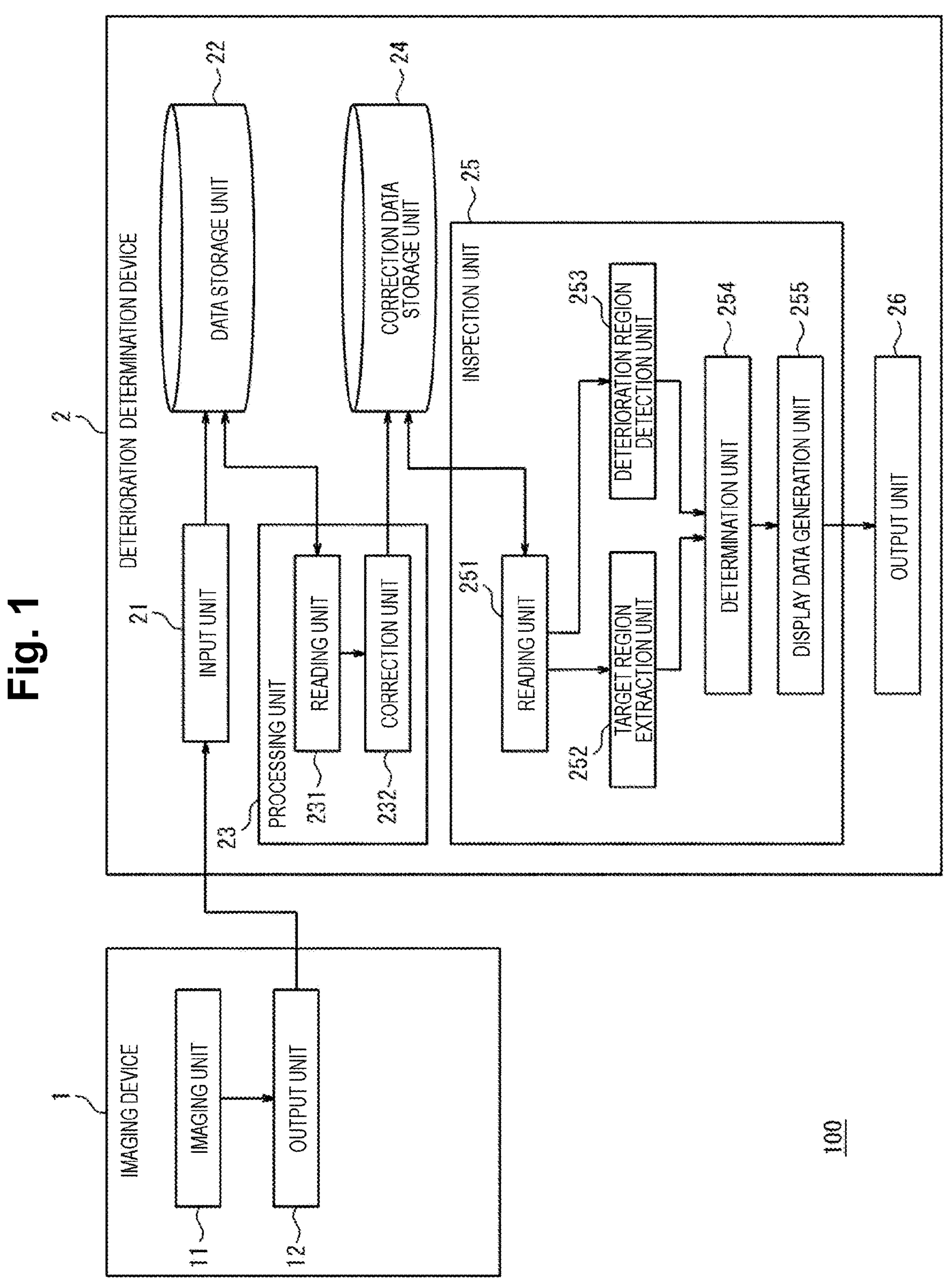
FIG. 1 is a schematic diagram of a deterioration determination system according to an embodiment of the present disclosure.

An overall configuration of the present embodiment will be described with reference to FIG. 1. FIG. 1 is a schematic diagram illustrating a deterioration determination system 100 according to the present embodiment.

As illustrated in FIG. 1, the deterioration determination system 100 according to the present embodiment includes an imaging device 1 and a deterioration determination device 2. The imaging device 1 and the deterioration determination device 2 communicate with each other via a communication network.

<Configuration of Imaging Device>

The imaging device 1 includes an imaging unit 11 and an output unit 12. The imaging unit 11 includes a camera including an optical element, an imaging element, and the like. The camera may be a telephoto camera or a camera such as imaging equipment mounted on an unmanned aerial vehicle (UAV). The output unit 12 may be configured by an output interface for outputting information, or may be configured by a communication interface for communicating with another device such as an external device. For the communication interface, for example, a standard such as Ethernet (registered trademark), fiber distributed data interface (FDDI), or Wi-Fi (registered trademark) may be used.

The imaging unit 11 images an inspection object and generates an image including a figure of the inspection object. The inspection object is an object such as equipment to be inspected, and can be a bridge, a bridge attachment member, a pipeline (bridge attachment pipeline), a pipeline attachment member, or the like. The image may be an image represented by three colors of red (R), green (G), and blue (B).

The output unit 12 transmits image data indicating the image generated by the imaging unit 11 to the deterioration determination device 2 via the communication network. As described above, in a case where the image generated by the imaging unit 11 is an image represented by three colors of R, G, and B, the image data can be data indicating the RGB value of each pixel.

<Configuration of Deterioration Determination Device>

The deterioration determination device 2 may be a terminal device such as a personal computer (PC) or a tablet, or may be a computer device configured integrally with the imaging device 1 described above. The deterioration determination device 2 includes an input unit 21, a data storage unit 22, a processing unit 23, a correction data storage unit 24, an inspection unit 25, and an output unit 26. The input unit 21 may be configured by an input interface that receives input of information, or may be configured by a communication interface that receives information. The data storage unit 22 and the correction data storage unit 24 include a memory such as a hard disk drive (HDD), a solid state drive (SSD), an electrically erasable programmable read only memory (EEPROM), a read-only memory (ROM), and a random access memory (RAM). The processing unit 23 and the inspection unit 25 are included in a control unit (controller). The control unit may include dedicated hardware such as an application specific integrated circuit (ASIC) or a field-programmable gate array (FPGA), may include a processor, or may be formed to include both dedicated hardware and a processor. The output unit 26 may be configured by an output interface that outputs information or may be configured by a communication interface that transmits information.

Figure 2A:
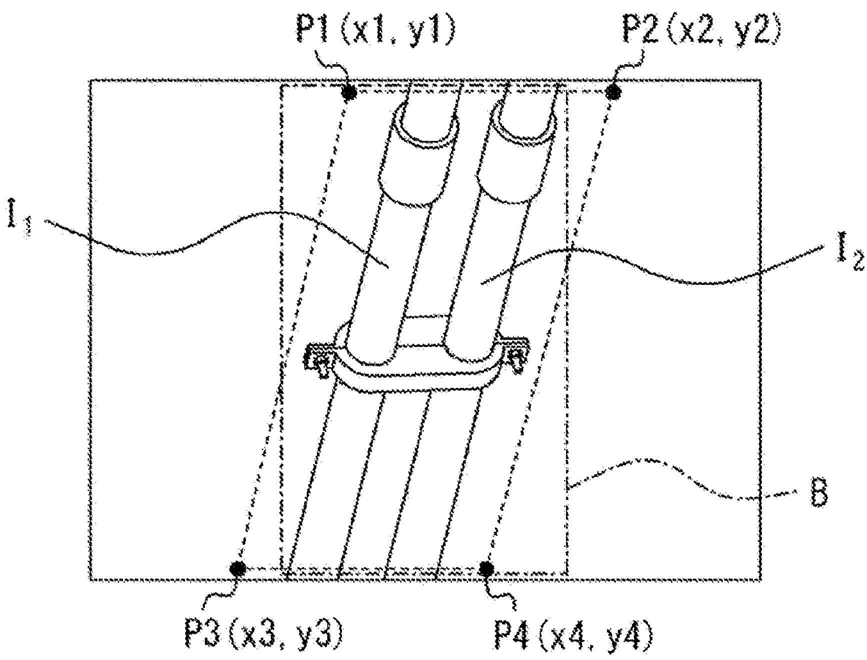
FIG. 2A is a diagram illustrating an example of an image indicated by image data.

The input unit 21 receives an input of image data indicating an image generated by the imaging device 1 imaging the inspection object. For example, the input unit 21 may receive an input of image data indicating an image including figures $I_1$ and $I_2$ of two pipelines, which are a plurality of inspection objects, as illustrated in FIG. 2A.

The data storage unit 22 stores the image data input by the input unit 21. The data storage unit 22 can store image data in, for example, a directory that is a virtual data storage region provided in the data storage unit 22.

The processing unit 23 processes the image data. The processing unit 23 includes a reading unit 231 and a correction unit 232. The processing unit 23 may further include a functional unit that performs arbitrary data processing such as image size change, bit size change, and color space separation.

The reading unit 231 reads the image data stored by the data storage unit 22. At this time, the reading unit 231 can apply an identifier for uniquely identifying the image data to the read image data. The identifier can be, for example, a number. In addition, the identifier can be a number obtained by adding a predetermined value at a time in the order in which the image data is input. The predetermined value can be 1. In particular, in a case where the image input by the input unit 21 is a moving image including a plurality of still images, the reading unit 231 provides an identifier for each piece of image data indicating a still image included in the moving image. As a result, even in a case where input of a plurality of pieces of image data is received, a result of processing by each functional unit described later can be associated with the image data. Hereinafter, the still image is simply referred to as an "image".

When reading the image data stored in the data storage unit 22, the reading unit 231 may determine the format of the image data, specifically, the extension of the image data. Specifically, in a case where each functional unit described below is configured to process image data in a predetermined format, that is, image data having a predetermined extension, the reading unit 231 determines whether the format of the image data is a predetermined format. Then, when it is determined that the format of the image data is not the predetermined format, the reading unit 231 converts the format of the image data into the predetermined format. When it is determined that the format of the image data is the predetermined format, the reading unit 231 does not convert the format of the image data. Specifically, the reading unit 231 determines whether the extension of the image data is a predetermined extension. Then, when it is determined that the extension of the image data is not the predetermined extension, the reading unit 231 converts the extension of the image data into the predetermined extension. In addition, when the extension of the image data is determined to be the predetermined extension, the reading unit 231 does not convert the extension of the image data.

The correction unit 232 generates a corrected image in which the image is corrected so as to increase the aspect ratio of the region surrounding the figure of at least some inspection objects included in the image indicated by the image data. The predetermined region can be a bounding box. As a result, inclusion of a subject such as a background other than the inspection object in the bounding box is reduced. Therefore, the accuracy of extraction of the target region by the target region extraction unit 252 to be described in detail later is enhanced.

Specifically, the correction unit 232 generates a corrected image corrected by geometrically converting the image including the figure of the inspection object. The geometric transformation by the correction unit 232 can be an affine transformation, a projective transformation, or the like.

For example, first, as illustrated in FIG. 2A, the correction unit 232 sets four points to be vertices of a rectangular region including a figure of the inspection object. In FIG. 2A, the coordinates of the four points are represented by P1 (x1, y1), P2 (x2, y2), P3 (x3, y3), and P4 (x4, y4), respectively.

Figure 2B:
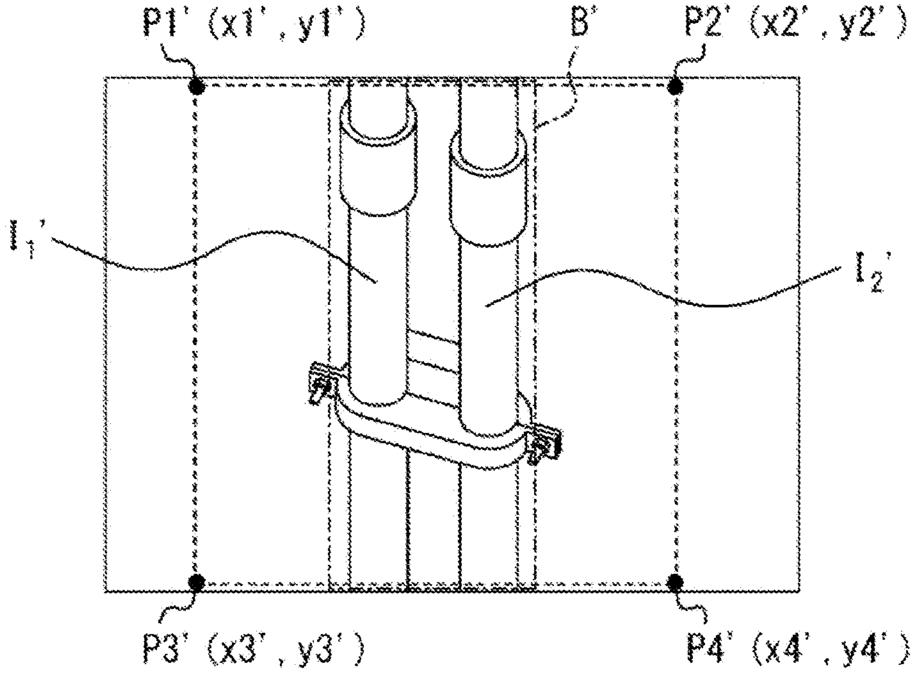
FIG. 2B is a diagram illustrating an example of a corrected image generated by correcting the image illustrated in FIG. 2A.

Then, the correction unit 232 converts the angle in the direction in which the inspection object extends with respect to the predetermined direction by projective transformation using the set four points. As a result, the correction unit 232 generates a corrected image in which the figure of the inspection object is corrected to an image along the side of the bounding box. In this example, the correction unit 232 generates a corrected image corrected by converting a region surrounded by a rectangle having vertices at coordinates P1 (x1, y1), P2 (x2, y2), P3 (x3, y3), and P4 (x4, y4) illustrated in FIG. 2A into a region surrounded by a rectangle having vertices at P1' (x1', y1'), P2' (x2', y2'), P3' (x3', y3'), and P4' (x4', y4'), respectively. In this manner, the correction unit 232 generates a corrected image obtained by correcting the figures $I_1$ and $I_2$ of the pipeline, which are the inspection objects illustrated in FIG. 2A, to figures $I_1'$ and $I_2'$ of the pipeline illustrated in FIG. 2B. In this example, the region (bounding box B) including the inspection object as illustrated in FIG. 2A is converted into the region (bounding box B') including the inspection object as illustrated in FIG. 2B, and as described above, the aspect ratio of the region including the inspection object is large.

The correction unit 232 generates a corrected image obtained by correcting the image using the projective transformation, but the present disclosure is not limited thereto, and the correction unit 232 may correct the image using the affine transformation. However, in a case where the correction unit 232 corrects the image using the affine transformation, mapping using the projective transformation cannot be performed. Therefore, using the projective transformation, the correction unit 232 can correct the image with a higher degree of freedom than the case of using the affine transformation.

In addition, in the configuration in which the correction unit 232 generates the corrected image corrected using the projective transformation, the correction unit 232 may determine whether or not it is possible to select four points to be vertices of a rectangular region including the figure of the inspection object. For example, in a case where the inspection object extends in a direction facing the imaging surface of the imaging device 1, the target region may not form a quadrangle. In such a case, the correction unit 232 cannot select four points and does not perform the correction described above. Along with this, processing in each functional unit to be described later is not performed.

In addition, the correction unit 232 may add an identifier to the corrected image data indicating the corrected image. The identifier applied to the corrected image data may be the same identifier as the identifier given to the image data before correction, or may be a different identifier that can be recognized to be related to the identifier applied to the image data before correction.

The correction data storage unit 24 stores corrected image data indicating a corrected image generated by the correction unit 232 correcting the image. The correction data storage unit 24 stores the corrected image data in a predetermined directory. Note that the directory in which the correction data storage unit 24 stores the correction data may be the same as or different from the directory used by the processing unit 23.

The inspection unit 25 determines the deterioration degree of the inspection object indicated by the figure included in the corrected image based on the corrected image indicated by the corrected image data. The inspection unit 25 includes a reading unit 251, a target region extraction unit 252, a deterioration region detection unit 253, a determination unit 254, and a display data generation unit 255.

The reading unit 251 reads out the corrected image data stored in the correction data storage unit 24. Specifically, the reading unit 251 reads out corrected image data indicating the corrected image corrected by the correction unit 232 from a predetermined directory in the correction data storage unit 24.

Figure 2C:
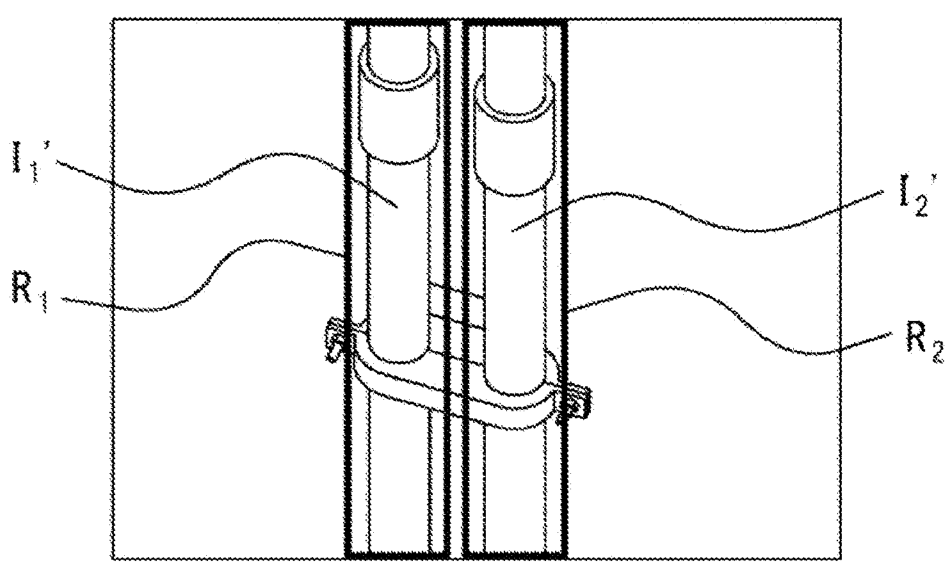
FIG. 2C is a diagram illustrating an example of a target region extracted from the corrected image illustrated in FIG. 2B.

The target region extraction unit 252 extracts a target region indicating a figure of the inspection object from the corrected image indicated by the corrected image data. For example, the target region extraction unit 252 detects the figure of the inspection object from the corrected image using segmentation for each class by instance segmentation (for example, Mask-R-CNN) or the like which is a deep learning method. In such a configuration, the target region extraction unit 252 can detect figures of a plurality of inspection objects included in the corrected image separately. In the example illustrated in FIGS. 2B and 2C, the target region extraction unit 252 extracts target regions $R_1$ and $R_2$ as indicated by solid rectangles in FIG. 2C, which are regions including the figures $I_1$ and $I_2$ of the two pipelines, respectively, from the image indicated by the corrected image data illustrated in FIG. 2B.

Figure 3A:
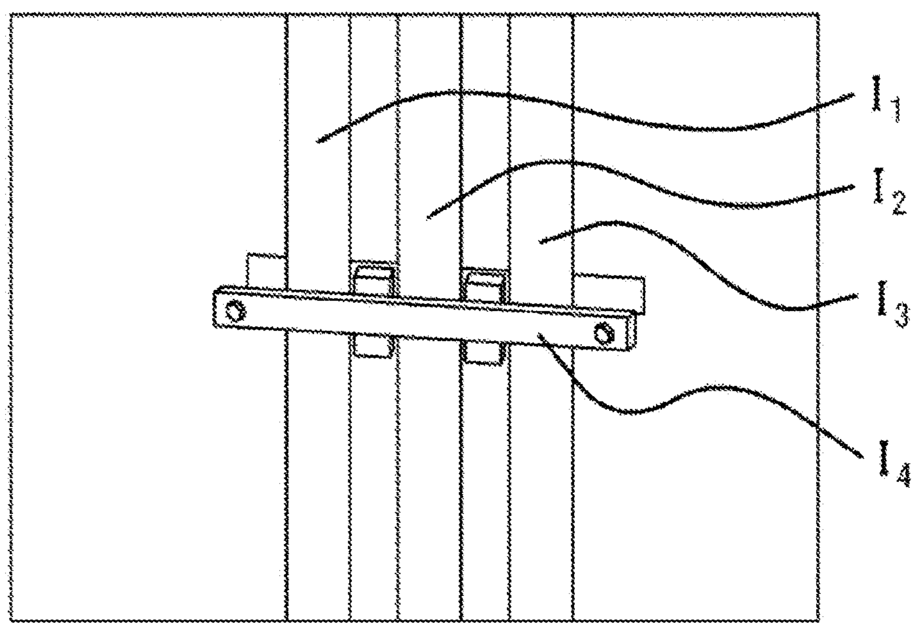
FIG. 3A is a diagram illustrating another example of the corrected image.
Figure 3B:
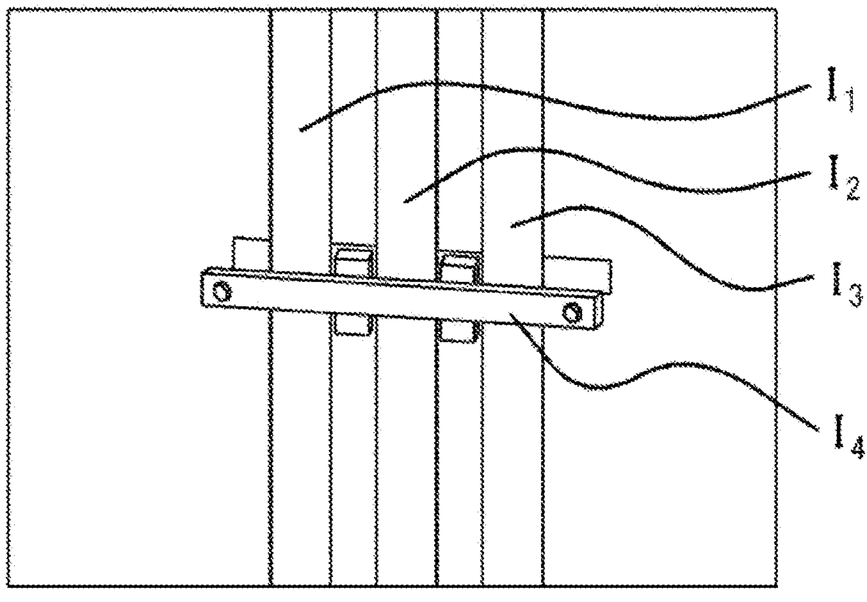
FIG. 3B is a diagram illustrating an example of a target region extracted from the corrected image illustrated in FIG. 3A.

In addition, in a case where the inspection object is three pipelines and an attachment member that attaches the three pipelines, as illustrated in FIG. 3A, the corrected image indicated by the corrected image data includes figures $I_1$, $I_2$, and $I_3$ of the three pipelines and a figure $I_4$ of the attachment member. In such an example, as illustrated in FIG. 3B, the target region extraction unit 252 extracts target regions $R_{1A}$, $R_{2A}$, $R_{3A}$, and $R_{4A}$, which are regions indicating figures $I_1$, $I_2$, $I_3$, and $I_4$, respectively.

Figure 3C:
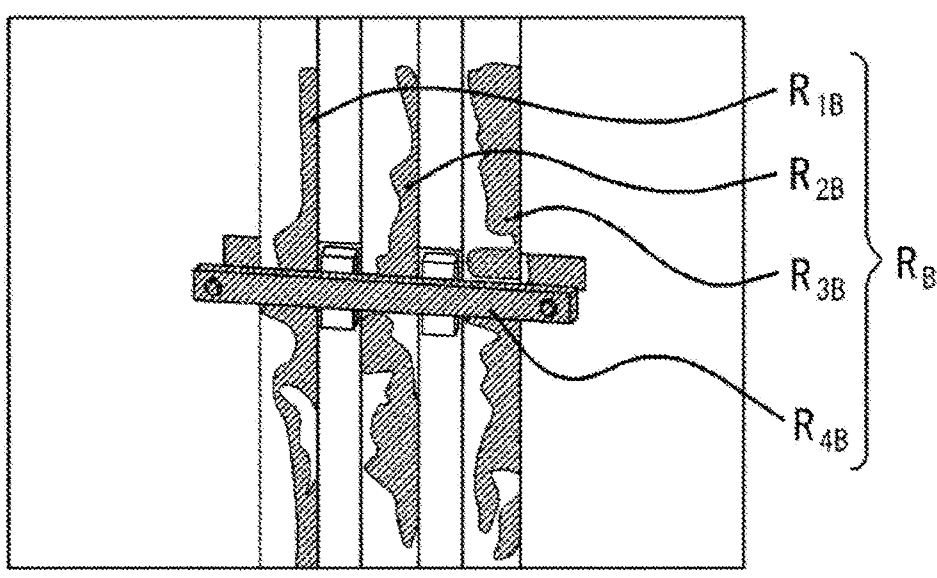
FIG. 3C is a diagram illustrating an example of a deterioration region detected from a figure of the object illustrated in FIG. 3A.

The deterioration region detection unit 253 detects a deterioration region indicating a figure of a deterioration portion in the inspection object from the corrected image indicated by the corrected image data. The deterioration region detection unit 253 can detect the deterioration region using a bounding box, class classification, segmentation, and the like which are deep learning methods. Note that the deterioration region detection unit 253 can detect deterioration for each pixel using segmentation. For example, the deterioration region detection unit 253 extracts deterioration regions $R_{1B}$, $R_{2B}$, $R_{3B}$, and $R_{4B}$ as illustrated in FIG. 3C from the target regions $R_{1A}$, $R_{2A}$, $R_{3A}$, and $R_{4A}$ as illustrated in FIG. 3B.

The determination unit 254 determines the deterioration degree of the inspection object based on the target region and the deterioration region in the corrected image indicated by the corrected image data.

First, the determination unit 254 calculates the area of the target region. Furthermore, in a case where a plurality of target regions is extracted, the determination unit 254 may individually calculate the area of each target region. When calculating the area of the target region, the determination unit 254 may calculate the area by counting the number of pixels that is the number of pixels configuring the figure of the inspection object.

In addition, the determination unit 254 calculates the area of the deterioration region. As described above, in the configuration in which the deterioration region detection unit 253 detects the deterioration of the portion of the object in which the pixel indicates the figure for each pixel using the segmentation, the determination unit 254 may calculate the area of the deterioration region by counting the number of pixels in which the deterioration is detected. In this case, the determination unit 254 can efficiently calculate the area of the deterioration region using the deteriorated pixels detected by the deterioration region detection unit 253.

Then, the determination unit 254 determines the ratio of the area of the deterioration region to the area of the target region as the deterioration degree of the inspection object. At this time, the determination unit 254 may determine the ratio of the number of pixels configuring the deterioration region to the number of pixels configuring the target region as the deterioration degree.

As an example, as illustrated in FIG. 4, the determination unit 254 calculates the number of pixels Yi of a deterioration region $R_{iB}$ by calculating the logical product of a target region $R_{iA}$ (i=1 to N (N is the number of inspection objects)) and a deterioration region $R_B$ in the corrected image indicated by the corrected image data. That is, the determination unit 254 calculates the number of pixels Yi configuring the target region $R_{iA}$ and configuring the deterioration region $R_B$, that is, the number of pixels Yi configuring the deterioration region $R_{iB}$. Then, the ratio Yi/Xi of the number of pixels Yi of the deterioration region $R_{iB}$ to the number of pixels Xi of the target region $R_{iA}$ is determined as the deterioration degree.

The display data generation unit 255 generates display data indicating the deterioration degree determined by the determination unit 254. The display data generation unit 255 may generate the display data including the corrected image and the deterioration degree of the inspection object corresponding to the figure included in the corrected image. In addition, the display data generation unit 255 may generate, as illustrated in FIG. 5, the display data indicating the processed image obtained by performing processing indicating the deterioration region on the corrected image indicated by the corrected image data and the deterioration degree of each inspection object of which the figure is included in the processed image. The display data generation unit 255 may perform processing of indicating the deterioration region on the corrected image based on the deterioration degree instead of indicating the deterioration degree as in the example illustrated in FIG. 5 or indicating the deterioration degree. As an example, the display data generation unit 255 may indicate a deterioration region having a deterioration degree of less than 10% in blue, indicate a deterioration region having a deterioration degree of 10% or more and less than 30% in yellow, and indicate a deterioration region having a deterioration degree of 30% or more in red. The color indicated in the deterioration region according to the deterioration degree is not limited thereto, but it is preferable to indicate the deterioration region in a color that easily attracts the attention of the inspector as the deterioration degree increases. As a result, the inspector can immediately recognize an inspection object including a deterioration region having a high deterioration degree and quickly perform maintenance of the inspection object.

As described above, the correction unit 232 may add an identifier to the corrected image data indicating the corrected image. In such a configuration, in a case where the determination unit 254 of the display data generation unit 255 determines a plurality of deterioration degrees for each of the corrected images indicated by the plurality of pieces of corrected image data, the correction unit 232 gives an identifier to each of the plurality of pieces of corrected image data. Thus, the display data generation unit 255 can associate each of the plurality of deterioration degrees with the corrected image data using the identifier. Therefore, the display data generation unit 255 may generate the display data including the corrected image and the deterioration degree of the inspection object corresponding to the figure included in the corrected image using the identifier for each of the plurality of pieces of corrected image data.

The output unit 26 outputs the display data generated by the display data generation unit 255. Specifically, the output unit 26 may output the display data to a display interface such as a liquid crystal panel or an organic EL. Furthermore, the output unit 26 may output the display data to another device via, for example, a communication network.

<Operation of Deterioration Determination Device>

Figure 6:
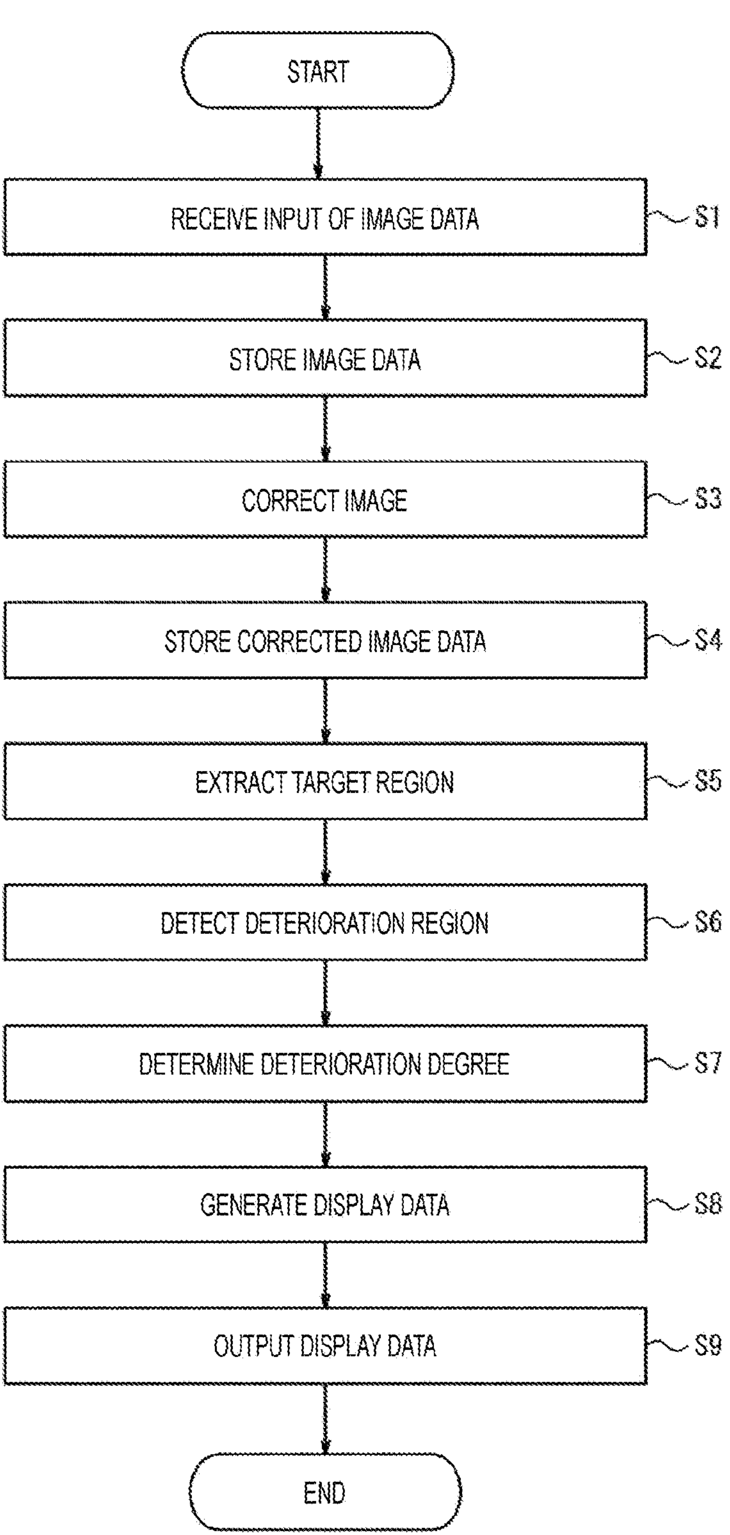
FIG. 6 is a flowchart illustrating an example of an operation of the deterioration determination device according to the embodiment.

Here, the operation of the deterioration determination device 2 according to the present embodiment will be described with reference to FIG. 6. FIG. 6 is a flowchart illustrating an example of operation in the deterioration determination device 2 according to the present embodiment. The operation of the deterioration determination device 2 described with reference to FIG. 6 corresponds to a congestion information processing method of the deterioration determination device 2 according to the present embodiment.

In step S1, the input unit 21 receives an input of image data indicating an image imaged by the imaging device 1.

In step S2, the data storage unit 22 stores the image data.

In step S3, the correction unit 232 generates a corrected image in which the image is corrected so as to increase the aspect ratio of the region surrounding the figure of at least some inspection objects included in the image indicated by the image data. At this time, the correction unit 232 generates a corrected image obtained by correcting the image indicated by the image data read from the data storage unit 22 by the reading unit 231. In addition, in reading the image data, the reading unit 231 may apply an identifier for uniquely identifying the image data to the read image data. Furthermore, the reading unit 231 may determine whether the format of the image data is a predetermined format. Then, when it is determined that the format of the image data is not the predetermined format, the reading unit 231 converts the format of the image data into the predetermined format. When it is determined that the format of the image data is not the predetermined format, the reading unit 231 does not convert the format of the image data, and in this case, the correction unit 232 may not generate the corrected image.

In step S4, the correction data storage unit 24 stores corrected image data indicating the corrected image generated by the correction unit 232.

In step S5, the target region extraction unit 252 extracts a target region indicating a figure of the inspection object from the corrected image indicated by the corrected image data. At this time, the target region extraction unit 252 can extract the target region from the corrected image indicated by the corrected image data stored in the correction data storage unit 24 and read by the reading unit 251.

In step S6, the deterioration region detection unit 253 detects a deterioration region indicating a figure of a deterioration portion in the inspection object from the corrected image indicated by the corrected image data. At this time, the target region extraction unit 252 can detect a figure of the inspection object from the corrected image indicated by the corrected image data stored in the correction data storage unit 24 and read by the reading unit 251.

In step S7, the determination unit 254 determines the deterioration degree of the inspection object based on the target region and the deterioration region in the corrected image indicated by the corrected image data.

In step S8, the display data generation unit 255 generates display data indicating the deterioration degree determined by the determination unit 254. At this time, the display data generation unit 255 may generate the display data including the corrected image and the deterioration degree of the inspection object corresponding to the figure included in the corrected image using the identifier.

In step S9, the output unit 26 outputs the display data.

As described above, according to the present embodiment, the deterioration determination device 2 generates the corrected image in which the image is corrected so that the aspect ratio of the region surrounding the figure of at least some inspection objects included in the image is increased. Then, the deterioration determination device 2 extracts a target region indicating a figure of the inspection object included in the corrected image from the corrected image, and detects a deterioration region indicating a figure of a deteriorated portion of the inspection object from the corrected image. Then, the deterioration determination device 2 determines the deterioration degree of the inspection object based on the target region and the deterioration region. As a result, the deterioration determination device 2 can detect the target region with high accuracy. Therefore, the deterioration region in the target region can be detected with high accuracy, and further, the deterioration degree based on the target region and the deterioration region can be detected with high accuracy. Therefore, the inspector who inspects the inspection object can appropriately recognize the deterioration degree of the inspection object, and can appropriately maintain the inspection object based on the deterioration degree.

In addition, the deterioration determination device 2 may determine the ratio of the number of pixels configuring the deterioration region to the number of pixels configuring the target region as the deterioration degree. As a result, in the configuration in which the deterioration determination device 2 detects the deterioration of the portion of the object in which the pixel indicates the figure for each pixel using the segmentation, the deterioration determination device 2 can calculate the area of the deterioration region by counting the number of pixels in which the deterioration is detected. Therefore, the deterioration determination device 2 can efficiently calculate the area of the deterioration region, and accordingly, can efficiently calculate the deterioration degree.

In addition, the deterioration determination device 2 may apply an identifier to each piece of corrected image data indicating the corrected image, and generate display data including the corrected image and the deterioration degree of the inspection object corresponding to the figure included in the corrected image using the identifier. As a result, the inspector of the inspection object referring to the display data can recognize which image data the input of which corresponds to the deterioration degree included in the display data. Therefore, the inspector can recognize the inspection object in which the image indicated by the image data includes the figure, and can appropriately perform the maintenance according to the deterioration degree.

<Program>

Figure 7:
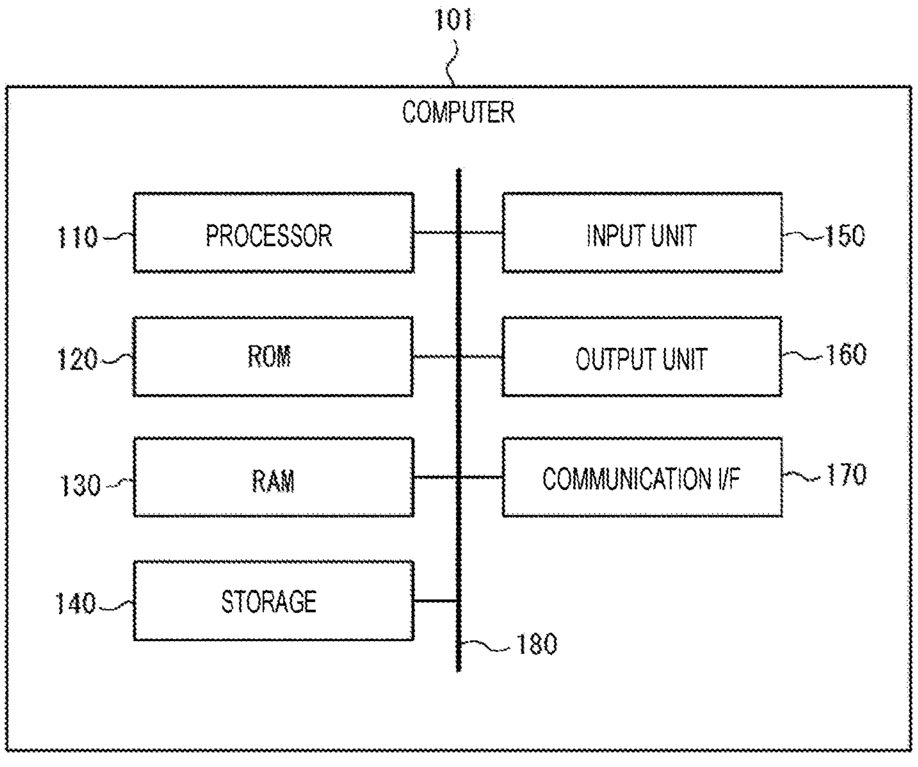
FIG. 7 is a hardware block diagram of the deterioration determination device.

The deterioration determination device 2 described above can be realized by a computer 101. In addition, a program for functioning as the deterioration determination device 2 may be provided. In addition, the program may be stored in a storage medium or may be provided through a network. FIG. 7 is a block diagram illustrating a schematic configuration of the computer 101 that functions as each of the control devices 3 and 3-1. Here, the computer 101 may be a general-purpose computer, a dedicated computer, a workstation, a personal computer (PC), an electronic note pad, or the like. The program command may be a program code, code segment, or the like for executing a necessary task.

As illustrated in FIG. 7, the computer 101 includes a processor 110, a read only memory (ROM) 120, a random access memory (RAM) 130, a storage 140, a reading unit 150, an output unit 160, and a communication interface (I/F) 170. The configurations are communicably connected to each other via a bus 180. Specifically, the processor 110 is a central processing unit (CPU), a micro processing unit (MPU), a graphics processing unit (GPU), a digital signal processor (DSP), a system on a chip (SoC), or the like and may be configured by the same or different types of plurality of processors.

The processor 110 executes control of the configurations and various types of arithmetic processing. That is, the processor 110 reads a program from the ROM 120 or the storage 140 and executes the program by using the RAM 130 as a working region. The processor 110 performs control of each of the foregoing configurations and various types of arithmetic processing according to a program stored in the ROM 120 or the storage 140. In the present embodiment, a program according to the present disclosure is stored in the ROM 120 or the storage 140.

The program may be stored in a storage medium that can be read by the computer 101. Using such a storage medium makes it possible to install the program in the computer 101. Here, the storage medium in which the program is stored may be a non-transitory storage medium. The non-transitory storage medium is not particularly limited, but may be, for example, a CD-ROM, a DVD-ROM, a universal serial bus (USB) memory, or the like. The program may be downloaded from an external device via a network.

The ROM 120 stores various programs and various types of data. The RAM 130 temporarily stores a program or data as a working region. The storage 140 includes a hard disk drive (HDD) or a solid state drive (SSD) and stores various programs including an operating system and various types of data.

The reading unit 150 includes one or more input interfaces that receive a user's input operation and acquire information based on the user's operation. For example, the reading unit 150 is a pointing device, a keyboard, a mouse, or the like, but the present disclosure is not limited thereto.

The output unit 160 includes one or more output interfaces that output information. For example, the output unit 160 is a display that outputs information as a video or a speaker that outputs information as an audio, but the present disclosure is not limited thereto. The output unit 160 also functions as the reading unit 150 when the output unit is a touch panel type display.

The communication interface 170 is an interface communicating with an external device.

Regarding the above embodiments, the following supplementary items are further disclosed.

(Supplementary Item 1)

A deterioration determination device including an input interface that receives an input of image data indicating an image including a figure of an inspection object, and a control unit, in which the control unit generates a corrected image in which the image is corrected to increase an aspect ratio of an area surrounding the figure of at least some inspection object included in the image, extracts, from the corrected image, a target region indicating the figure of the inspection object included in the corrected image, detects a deterioration region indicating a figure of a deterioration portion of the inspection object from the corrected image, and determines a deterioration degree of the inspection object based on the target region and the deterioration region.

(Supplementary Item 2)

The deterioration determination device according to Supplementary Item 1, in which the control unit determines a ratio of an area of the deterioration region to an area of the target region as the deterioration degree of the inspection object.

(Supplementary Item 3)

The deterioration determination device according to Supplementary Item 2, in which the control unit determines a ratio of the number of pixels configuring the deterioration region to the number of pixels configuring the target region as a deterioration degree.

(Supplementary Item 4)

The deterioration determination device according to any one of Supplementary Items 1 to 3, in which the control unit generates display data including the corrected image and the deterioration degree.

(Supplementary Item 5)

The deterioration determination device according to Supplementary Item 4, in which the control unit applies an identifier to each piece of corrected image data indicating the corrected image, and generates the display data including the corrected image and the deterioration degree of the inspection object corresponding to the figure included in the corrected image using the identifier.

(Supplementary Item 6)

A deterioration determination method including:

a step of receiving an input of image data indicating an image including a figure of an inspection object;

a step of generating a corrected image in which the image is corrected to increase an aspect ratio of an area surrounding the figure of at least some inspection object included in the image;

a step of extracting, from the corrected image, a target region indicating the figure of the inspection object included in the corrected image;

a step of detecting a deterioration region indicating a figure of a deterioration portion of the inspection object from the corrected image; and a step of determining a deterioration degree of the inspection object based on the target region and the deterioration region.

(Supplementary Item 7)

A non-transitory storage medium storing a program that can be executed by a computer, the non-transitory storage medium causing the computer to function as the deterioration determination device according to any one of Supplementary Items 1 to 5.

All documents, patent applications, and technical standards described in this specification are incorporated herein by reference to the same extent as if each individual document, patent application, and technical standard were specifically and individually described to be incorporated by reference.

Although the above-described embodiments have been described as representative examples, it is apparent to those skilled in the art that many modifications and substitutions can be made within the spirit and scope of the present disclosure. Accordingly, it should not be understood that the present invention is limited by the above-described embodiments, and various modifications or changes can be made within the scope of the claims. For example, a plurality of configuration blocks illustrated in the configuration diagrams of the embodiments can be combined into one, or one configuration block can be divided.

REFERENCE SIGNS LIST

1 Imaging device
2 Deterioration determination device
11 Imaging unit
12 Output unit
21 Input unit
22 Data storage unit
23 Processing unit
24 Correction data storage unit
25 Inspection unit
26 Output unit
100 Deterioration determination system
101 Computer
110 Processor
120 ROM
130 RAM
140 Storage
150 Reading unit
160 Output unit
170 Communication interface
180 Bus
231 Reading unit
232 Correction unit
251 Reading unit
252 Target region extraction unit
253 Deterioration region detection unit
254 Determination unit
255 Display data generation unit

The invention claimed is:

1. A deterioration determination device comprising a processor configured to execute operations comprising:

receiving an input of image data indicating an image including a figure of an inspection object, wherein the inspection object obliquely extend with respect to a peripheral edge defining an image of a physical pipeline material object that has an extended shape toward a direction;

generating a corrected image in which the image is corrected by converting an angle in the direction in which the inspection object extends with respect to a predetermined direction while increasing a width of the image and maintaining a height of the image to transform a shape of the image by pixel-by-pixel transformation, thereby increasing an aspect ratio of a region surrounding the figure of at least an inspection object included in the image;

extracting, from the corrected image, a target region indicating the figure of the inspection object included in the corrected image;

detecting a deterioration region indicating a figure of a deterioration portion of the inspection object from the corrected image; and determining a deterioration degree of the inspection object based on the target region and the deterioration region, wherein the deterioration region is represented according to a percentage of deterioration associated with a predetermined color.

2. The deterioration determination device according to claim 1, wherein the determining further comprises determining a ratio of an area of the deterioration region to an area of the target region as the deterioration degree of the inspection object.

3. The deterioration determination device according to claim 2, wherein the determining further comprises determining a ratio of the number of pixels configuring the deterioration region to the number of pixels configuring the target region as a deterioration degree.

4. The deterioration determination device according to claim 1, wherein the inspection object appears within a bounding box formed by the region surrounding the inspection object, and the corrected image depicts the figure of the inspection object extending along a side of the bounding box, and the processor further configured to execute operations comprising:

generating display data including the corrected image and the deterioration degree.

5. The deterioration determination device according to claim 4, wherein the generating a target region further comprises applying an identifier to each piece of corrected image data indicating the corrected image, and the generating display data further comprises generating the display data including the corrected image and the deterioration degree of the inspection object corresponding to the figure included in the corrected image using the identifier.

6. A deterioration determination method comprising: receiving an input of image data indicating an image including a figure of an inspection object obliquely extend with respect to a peripheral edge defining an image of a physical pipeline material object that, wherein the inspection object has an extended shape toward a direction;

generating a corrected image in which the image is corrected by converting an angle in the direction in which the inspection object extends with respect to a predetermined direction while increasing a width of the image and maintaining a height of the image to transform a shape of the image by pixel-by-pixel transformation, thereby increasing an aspect ratio of a region surrounding the figure of at least an inspection object included in the image;

extracting, from the corrected image, a target region indicating the figure of the inspection object included in the corrected image;

detecting a deterioration region indicating a figure of a deterioration portion of the inspection object from the corrected image; and determining a deterioration degree of the inspection object based on the target region and the deterioration region, wherein the deterioration region is represented according to a percentage of deterioration associated with a predetermined color.

7. A computer-readable non-transitory recording medium storing a computer-executable program instructions that when executed by a processor cause a computer system to execute operations comprising:

receiving an input of image data indicating an image including a figure of an inspection object obliquely extend with respect to a peripheral edge defining an image of a physical pipeline material object that, wherein the inspection object has an extended shape toward a direction;

generating a corrected image in which the image is corrected by converting an angle in the direction in which the inspection object extends with respect to a predetermined direction while increasing a width of the image and maintaining a height of the image to transform a shape of the image by pixel-by-pixel transformation, thereby increasing an aspect ratio of a region surrounding the figure of at least an inspection object included in the image;

extracting, from the corrected image, a target region indicating the figure of the inspection object included in the corrected image;

detecting a deterioration region indicating a figure of a deterioration portion of the inspection object from the corrected image; and determining a deterioration degree of the inspection object based on the target region and the deterioration region wherein the deterioration region is represented according to a percentage of deterioration associated with a predetermined color.

8. The deterioration determination device according to claim 2, wherein the inspection object appears within a bounding box formed by the region surrounding the inspection object, and the corrected image depicts the figure of the inspection object extending along a side of the bounding box, and the processor further configured to execute operations comprising:

generating display data including the corrected image and the deterioration degree.

9. The deterioration determination device according to claim 3, wherein the inspection object appears within a bounding box formed by the region surrounding the inspection object, and the corrected image depicts the figure of the inspection object extending along a side of the bounding box, and the processor further configured to execute operations comprising:

generating display data including the corrected image and the deterioration degree.

10. The deterioration determination method according to claim 6, wherein the determining further comprises determining a ratio of an area of the deterioration region to an area of the target region as the deterioration degree of the inspection object.

11. The deterioration determination method according to claim 10, wherein the determining further comprises determining a ratio of the number of pixels configuring the deterioration region to the number of pixels configuring the target region as a deterioration degree.

12. The deterioration determination method according to claim 6, wherein the inspection object appears within a bounding box formed by the region surrounding the inspection object, and the corrected image depicts a figure of the inspection object extending along a side of the bounding box, and the deterioration determination method further comprising:

generating display data including the corrected image and the deterioration degree.

13. The deterioration determination method according to claim 12, wherein the generating a target region further comprises applying an identifier to each piece of corrected image data indicating the corrected image, and the generating display data further comprises generating the display data including the corrected image and the deterioration degree of the inspection object corresponding to the figure included in the corrected image using the identifier.

14. The deterioration determination method according to claim 10, wherein the inspection object appears within a bounding box formed by the region surrounding the inspection object, and the corrected image depicts a figure of the inspection object extending along a side of the bounding box, and the deterioration determination method further comprising: generating display data including the corrected image and the deterioration degree.

15. The deterioration determination method according to claim 11, wherein the inspection object appears within a bounding box formed by the region surrounding the inspection object, and the corrected image depicts a figure of the inspection object extending along a side of the bounding box, and the deterioration determination method further comprising: generating display data including the corrected image and the deterioration degree.

16. The computer-readable non-transitory recording medium according to claim 7, wherein the determining further comprises determining a ratio of an area of the deterioration region to an area of the target region as the deterioration degree of the inspection object.

17. The computer-readable non-transitory recording medium according to claim 16, wherein the determining further comprises determining a ratio of the number of pixels configuring the deterioration region to the number of pixels configuring the target region as a deterioration degree.

18. The computer-readable non-transitory recording medium according to claim 7, wherein the inspection object appears within a bounding box formed by the region surrounding the inspection object, and the corrected image depicts a figure of the inspection object extending along a side of the bounding box, and the computer-executable program instructions when executed further causing the computer system to execute operations comprising:

generating display data including the corrected image and the deterioration degree.

19. The computer-readable non-transitory recording medium according to claim 18, wherein the generating a target region further comprises applying an identifier to each piece of corrected image data indicating the corrected image, and the generating display data further comprises generating the display data including the corrected image and the deterioration degree of the inspection object corresponding to the figure included in the corrected image using the identifier.

20. The computer-readable non-transitory recording medium according to claim 16, wherein the inspection object appears within a bounding box formed by the region surrounding the inspection object, and the corrected image depicts a figure of the inspection object extending along a side of the bounding box, and the computer-executable program instructions when executed further causing the computer system to execute operations comprising:

generating display data including the corrected image and the deterioration degree.

* * * * *